United States Patent
Yoshihama (10) Patent No.: US 11,055,545 B2
(45) Date of Patent: Jul. 6, 2021

(54) OBJECT RECOGNITION APPARATUS

(71) Applicant: TOYOTA JIDOSHA KABUSHIKI KAISHA, Toyota (JP)

(72) Inventor: Yuki Yoshihama, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 71 days.

(21) Appl. No.: 16/430,527

(22) Filed: Jun. 4, 2019

(65) Prior Publication Data

US 2019/0377960 A1 Dec. 12, 2019

(30) Foreign Application Priority Data

Jun. 6, 2018 (JP) .............................. JP2018-108668

(51) Int. Cl.
*G06K 9/00* (2006.01)
*G06T 7/20* (2017.01)
*G06T 7/70* (2017.01)

(52) U.S. Cl.
CPC ..... *G06K 9/00805* (2013.01); *G06K 9/00369* (2013.01); *G06T 7/20* (2013.01); *G06T 7/70* (2017.01); *G06T 2207/30261* (2013.01)

(58) Field of Classification Search
CPC .......... G06K 9/00805; G06K 9/00335; G06K 9/00369; G06T 2207/30261; G06T 2207/30232; G06T 2207/30242; G06T 2207/30196; G06T 7/20; G06T 7/70; G06T 7/246; G06T 7/248; G01B 11/026; G08G 1/16; G08G 1/166; B60W 30/09
See application file for complete search history.

(56) References Cited

U.S. PATENT DOCUMENTS

2018/0218227 A1* 8/2018 Takaki ................. B60W 30/09
2018/0357772 A1* 12/2018 Takemura .......... G06K 9/00369

FOREIGN PATENT DOCUMENTS

JP       2004-258925 A       9/2004
JP       2006-048338 A       2/2006

* cited by examiner

*Primary Examiner* — Matthew C Bella
*Assistant Examiner* — Kaleb Tessema
(74) *Attorney, Agent, or Firm* — Sughrue Mion, PLLC (57) ABSTRACT

An object recognition apparatus is provided with: a recognizer configured to recognize a plurality of objects; an acquirer configured to obtain behavior information; a parallel moving determinator configured to determine whether or not a parallel moving condition is satisfied, indicating that there are a first object and a second object, which move in parallel; a recognition determinator configured to determine whether or not a recognition condition is satisfied, indicating that there is the second object among the objects recognized in second timing; a recognition number determinator configured to determine whether or not a recognition number condition is satisfied, indicating that a number of the objects recognized in the second timing is reduced; and a parallel moving loss determinator configured to determine that the first object is in a parallel-moving-object-lost state, if the parallel moving condition, the recognition condition and the recognition number conditions are satisfied.

3 Claims, 6 Drawing Sheets

OBJECT RECOGNITION APPARATUS

CROSS-REFERENCE TO RELATED APPLICATIONS

This application is based upon and claims the benefit of priority of the prior Japanese Patent Application No. 2018-108668, filed on Jun. 6, 2018, the entire contents of which are incorporated herein by reference.

BACKGROUND

1. Technical Field

Embodiments of the present disclosure relate to an object recognition apparatus configured to recognize an object around a vehicle.

2. Description of the Related Art

This type of apparatus is configured to perform a process of determining that a recognized object is lost, i.e., that a recognized object can no longer be recognized. For example, Japanese Patent Application Laid Open No. 2006-48338 (Patent Literature 1) discloses a technology/technique in which it is determined that a tracking moving body is lost due to the presence of a shield body, and in which it is then determined whether or not a moving body reflected in another place is the same as the previously recognized moving body, on the basis of a lost position. Japanese Patent Application Laid Open No. 2004-258925 (Patent Literature 2) discloses a technology/technique of identifying whether a tracking target stands still or is hidden (i.e., is hidden by a wall or the like).

If a plurality of objects that are in a recognition range move in parallel with each other (i.e., the objects move in the same direction side by side) and if the objects overlap each other, it is possibly recognized as if the number of the objects were temporarily reduced. In other words, the object may be lost due to the parallel movement. In the technologies/techniques described in the Patent Literatures 1 and 2, however, the loss of the parallel moving object is not considered. Thus, even when the parallel moving object is lost, there is a possibility that the loss cannot be accurately detected, or that a cause of the loss cannot be determined. If the cause of the loss cannot be determined, for example, it is hard to estimate the position of the lost object, or a wrong position is estimated, which is technically problematic.

SUMMARY

In view of the aforementioned problem, it is therefore an object of embodiments of the present disclosure to provide an object recognition apparatus configured to determine a recognition loss of the parallel moving object.

The above object of embodiments of the present disclosure can be achieved by an object recognition apparatus provided with: a recognizer configured to recognize a plurality of objects; an acquirer configured to obtain behavior information about behaviors of the objects recognized in first timing by the recognizer; a parallel moving determinator configured to determine whether or not a parallel moving condition is satisfied on the basis of the behavior information, wherein the parallel moving condition indicates that there are a first object and a second object, which move in parallel with each other, among the objects recognized in the first timing; a recognition determinator configured to determine whether or not a recognition condition is satisfied, wherein the recognition condition indicates that there is the second object among the objects recognized by the recognizer in second timing, which is later than the first timing; a recognition number determinator configured to determine whether or not a recognition number condition is satisfied, wherein the recognition number condition indicates that a number of the objects recognized in the second timing is reduced in comparison with a number of the objects recognized in the first timing; and a parallel moving loss determinator configured to determine that the first object is in a parallel-moving-object-lost state in which recognition by the recognizer cannot be performed due to an overlap with the second object, if the recognition condition and the recognition number conditions are satisfied in the second timing, after the parallel moving condition is satisfied in the first timing.

DETAILED DESCRIPTION OF THE EMBODIMENTS

DETAILED DESCRIPTION OF THE EMBODIMENT

Hereinafter, an object recognition apparatus according to an embodiment of the present disclosure will be explained with reference to the drawings.

Configuration of Apparatus

Figure 1:
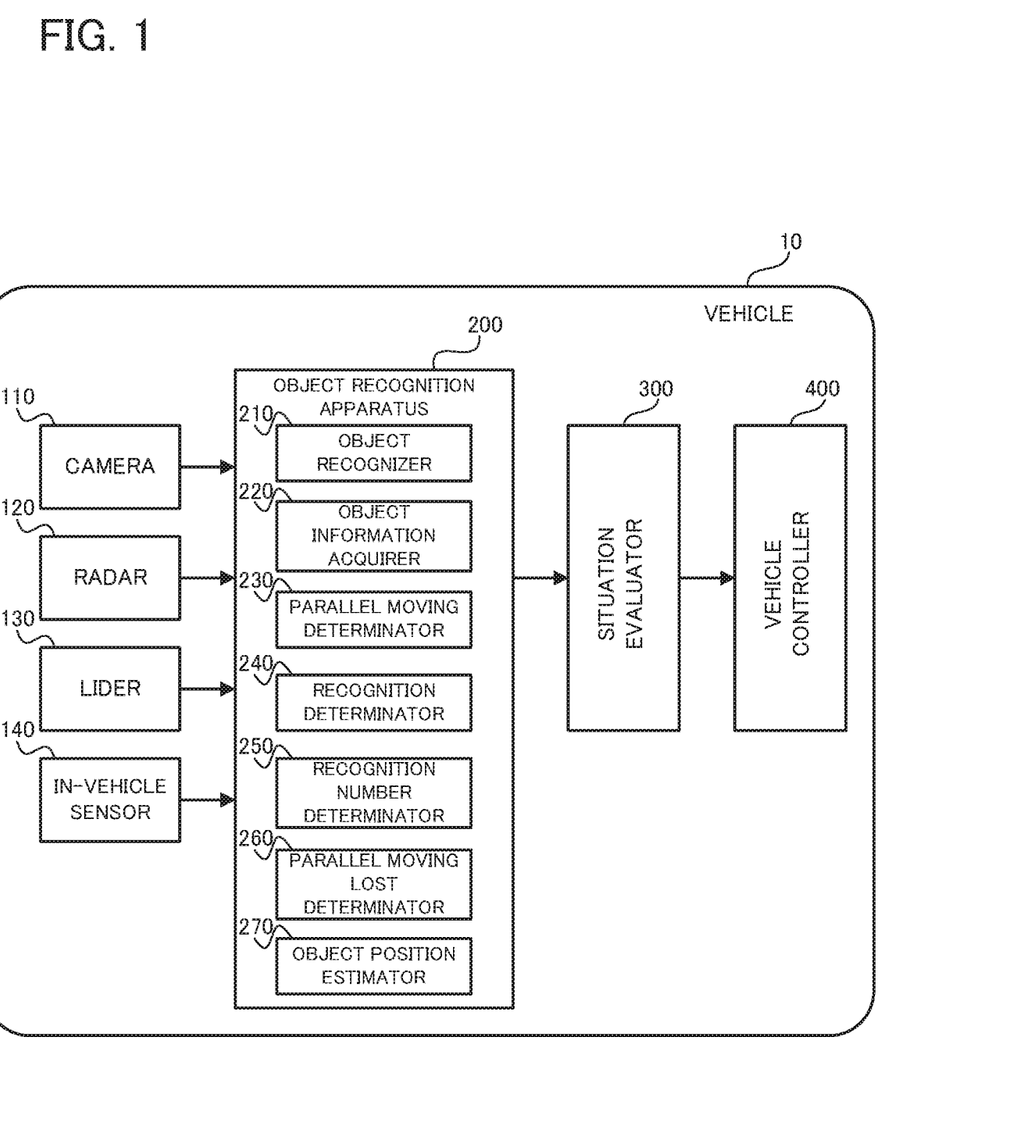
FIG. 1 is a block diagram illustrating a configuration of a vehicle according to an embodiment.

Firstly, an entire configuration of a vehicle on which the object recognition apparatus according to the embodiment is mounted will be explained with reference to FIG. 1. FIG. 1 is a block diagram illustrating the configuration of the vehicle according to the embodiment.

As illustrated in FIG. 1, a vehicle 10 according to the embodiment is provided with a camera 110, a radar 120, a light detection and ranging (LIDER) 130, an in-vehicle sensor 140, an object recognition apparatus 200, a situation evaluator 300, and a vehicle controller 400.

The camera 110 is provided, for example, in a position in which an image of a scene ahead of the vehicle 10 can be imaged or captured. The radar 120 and the LIDER 130 are configured, for example, to detect an object (e.g., a pedestrian, etc.) that is ahead of the vehicle 10. The in-vehicle sensor 140 includes, for example, a vehicle speed sensor, an acceleration sensor, a yaw rate sensor, or the like, and is configured to detect various parameters that indicate a running situation of the vehicle 10. Detection results of the camera 110, the radar 120, the LIDER 130, and the in-vehicle sensor 140 may be respectively outputted to the object recognition apparatus 200.

The object recognition apparatus 200 is a controller unit configured to control the operation of each part of the vehicle 10 (e.g., ECU: Electronic Control Unit). Particularly in the embodiment, the object recognition apparatus 200 is configured to recognize an object that is around the vehicle 10 and to output various information about the recognized object. The object recognition apparatus 200 is provided with an object recognizer 210, an object information acquirer 220, a parallel moving determinator 230, a recognition determinator 240, a recognition number determinator 250, a parallel moving loss determinator 260, and an object position estimator 270, as processing blocks or physical processing circuits for realizing the aforementioned function.

The object recognizer 210 is configured to perform a process of recognizing an object that is in a captured image (in other words, around the vehicle 10) by using the detection result of the camera 110. The object recognizer 210 may perform the process of recognizing the object by using the detection results of the radar 120 and the LIDER 130 in addition to the camera 110. A detailed explanation of a specific method of recognizing the object performed by the object recognizer 210 will be omitted herein because the existing technologies/techniques can be adopted, as occasion demands. The object recognizer 210 is a specific example of the "recognizer" in Supplementary Notes described later.

The object information acquirer 220 is configured to obtain various information about the recognized object (e.g., a position, a size, a speed, and a type of the object, etc.), from a recognition result of the object recognizer 210. Moreover, in particular, the object information acquirer 220 according to the embodiment is configured to obtain a motion vector of each object (i.e., information indicating a moving direction and speed), and a distance between two different objects. The object information acquirer 220 is a specific example of the "acquirer" in Supplementary Notes described later. The various information detected by the object information acquirer 220 is a specific example of the "behavior information" in Supplementary Notes described later.

The parallel moving determinator 230 is configured to determine whether or not objects moving in parallel with each other (hereinafter referred to as "parallel moving objects" as occasion demands) are included in objects recognized by the object recognizer 210 in arbitrary first timing, on the basis of the information obtained by the object information acquirer 220. The parallel moving objects are a plurality of objects that move in substantially the same direction at substantially the same speed. Typically, two parallel moving objects form a group, but a group including three or more objects may be formed. A specific method of determining the parallel moving objects performed by the parallel moving determinator 230 will be detailed later. A determination result of the parallel moving determinator 230 may be outputted to the parallel moving loss determinator 260. The parallel moving determinator 230 is a specific example of the "the parallel moving determinator" in Supplementary Notes described later.

The recognition determinator 240 is configured to determine whether or not at least one object included in the parallel moving objects is recognized in second timing, which is later than first timing (i.e., timing in which the parallel moving objects are recognized), on the basis of the information obtained by the object information acquirer 220. In other words, the recognition determinator 240 is configured to determine whether or not at least one object out of the parallel moving objects recognized in the first timing continues to be recognized even later in the second timing (to put it differently, whether or not the parallel moving object is in a view angle of the camera 110). A determination result of the recognition determinator 240 may be outputted to the parallel moving loss determinator 260. The recognition determinator 240 is a specific example of the "the recognition determinator" in Supplementary Notes described later.

The recognition number determinator 250 is configured to determine whether or not the number of the objects recognized in the second timing (i.e., the determination timing of the recognition determinator 240) is reduced in comparison with the number of the objects recognized in the first timing (i.e., the determination timing of the parallel moving determinator 230), on the basis of the information obtained by the object information acquirer 220. In other words, the recognition number determinator 250 is configured to determine whether or not the number of the recognized objects is reduced over time. The number of the objects used by the recognition number determinator 250 for the determination may be the number of all the objects recognized by the object recognizer 210, or may be the number of the objects determined to be the parallel moving objects. The recognition number determinator 250 is further configured to detect the presence of another object as a shield body, which cuts in between the camera 110 and the objects determined to be the parallel moving objects, and is configured to determine whether or not the shield body influences a reduction in the number of the recognized objects. A determination result of the recognition number determinator 250 may be outputted to the parallel moving loss determinator 260. The recognition number determinator 250 is a specific example of the "the recognition number determinator" in Supplementary Notes described later.

The parallel moving loss determinator 260 is configured to determine whether or not one object determined to be the parallel moving object is in a state in which the one object cannot be recognized due to an overlap with the other object moving in parallel (hereinafter referred to as "parallel-moving-object-lost or loss", as occasion demands), on the basis of the determination results of the parallel moving determinator 230, the recognition determinator 240, and the recognition number determinator 250. A specific determination method performed by the parallel moving loss determinator 260 will be detailed later. The parallel moving loss determinator 260 may give an attribute, such as the "parallel-moving-object-lost or loss", to the object that is parallel-moving-object-lost. The parallel moving loss determinator 260 is a specific example of the "the parallel moving loss determinator" in Supplementary Notes described later.

The object position estimator 270 is configured to estimate a position of the object that is parallel-moving-object-lost if there is the parallel moving object loss. A specific method of estimating the position performed by the object position estimator 270 will be detailed later. The object position estimator 270 is a specific example of the "the object position acquirer" in Supplementary Notes described later.

The situation evaluator 300 is configured to determine how to control the running of the vehicle 10 on the basis of a recognition result of the object recognition apparatus 200. The situation evaluator 300 is configured to determine a running route and a running speed of the vehicle 10, and a parameter about a collision avoidance control (e.g., an automatic brake control), for example, to avoid a collision between the vehicle 10 and the recognized object. The parameter determined by the situation evaluator 300 may be outputted to the vehicle controller 400.

The vehicle controller 400 is configured or programmed to control each part of the vehicle 10 on the basis of the parameter inputted from the situation evaluator 300. The vehicle controller 400 may, for example, control a not-illustrated brake actuator of the vehicle 10 to perform the automatic brake control of the vehicle 10, or may control a not-illustrated steering actuator of the vehicle 10 to perform an automatic steering control of the vehicle 10.

Technical Problem that can Occur when Parallel Moving Objects are Recognized

Figure 2:
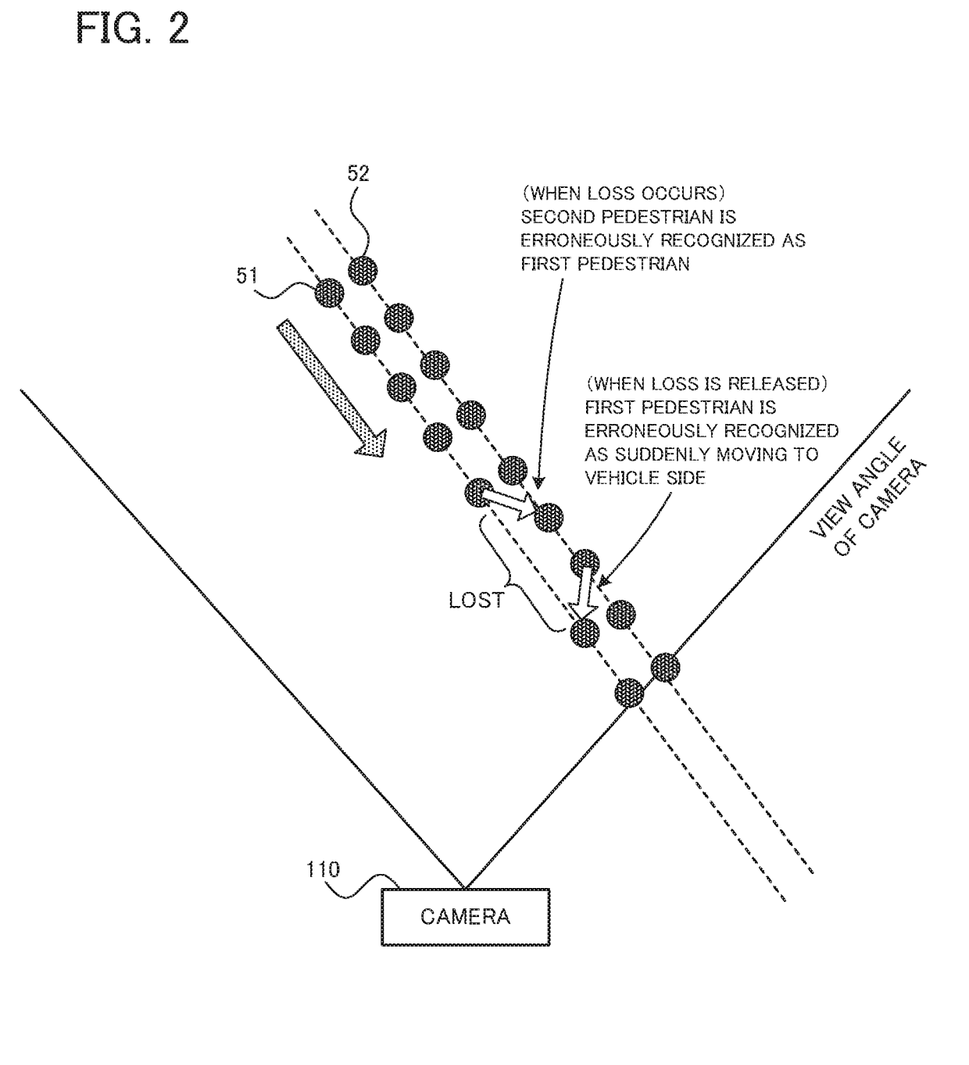
FIG. 2 is a map illustrating a recognition result of parallel moving objects in a time series.
Figure 3:
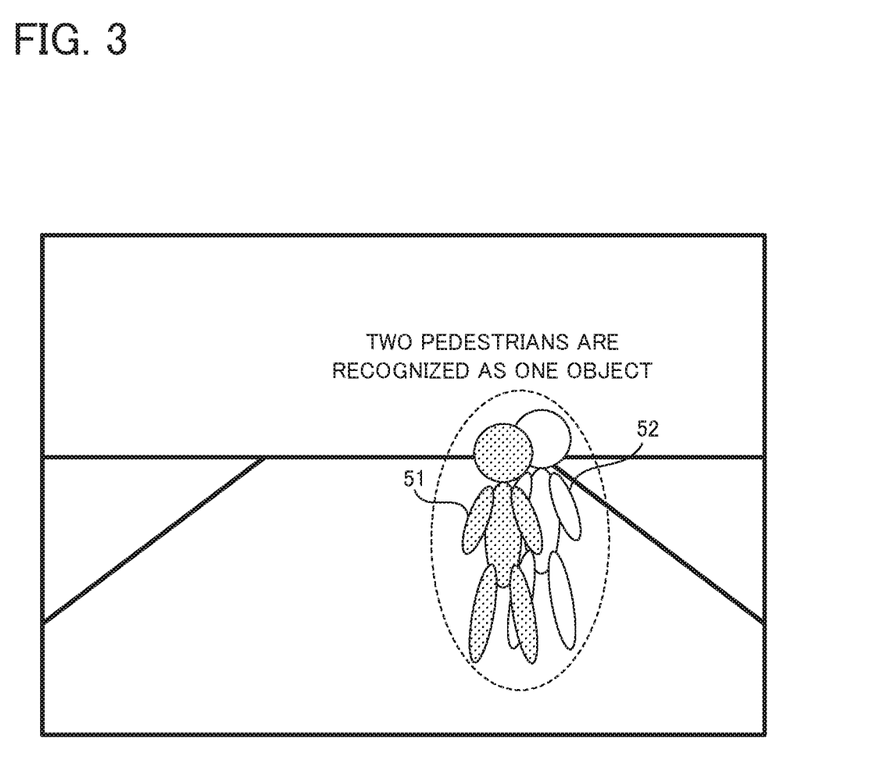
FIG. 3 is a diagram illustrating a specific example of a recognition loss caused by the overlap of the parallel moving objects.

Next, an explanation will be given to a technical problem that can occur when the parallel moving objects are recognized, with reference to FIG. 2 and FIG. 3. FIG. 2 is a map illustrating a recognition result of parallel moving objects in a time series. FIG. 3 is a diagram illustrating a specific example of a recognition loss caused by the overlap of the parallel moving objects.

As illustrated in FIG. 2, it is assumed that a first pedestrian 51 and a second pedestrian 52 moving in parallel with each other are in the view angle of the camera 110 of the vehicle 10. It is also assumed that the first pedestrian 51 and the second pedestrian 52 move side by side along dashed lines from the left back to the right front, as viewed from the camera 110.

In such an example, because the first pedestrian 51 and the second pedestrian 52 are relatively close in position, the first pedestrian 51 and the second pedestrian 52 viewed from the camera 110 overlap each other, resulting in a situation in which they are recognized as one object. Specifically, a situation as illustrated in FIG. 3 can occur. In this case, it is recognized as if one of the tracking parallel moving objects vanished. As a result, when a recognition loss occurs, the object that is to be recognized as the second pedestrian 52 could be recognized as the first pedestrian 51. In this case, the object recognition apparatus 200 possibly erroneously recognizes that the first pedestrian 51 has moved to the position of the second pedestrian 52.

On the other hand, after the recognition loss occurs, when the overlap of the first pedestrian 51 and the second pedestrian 52 is released, the first pedestrian 51 who was lost is correctly recognized. In other words, the first pedestrian 51 and the second pedestrian 52 are recognized as different objects. In this case, the object recognition apparatus 200 recognizes that the first pedestrian 51 has appeared suddenly in the original position. As a result, it is recognized as if the first pedestrian 51 recognized until immediately before the release of the recognition loss (who is actually the second pedestrian 52) has suddenly moved to the camera 110 side (in other words, to the vehicle 10).

As described above, if the object is recognized to have moved to the vehicle 10, it is determined that the collision avoidance control is to be performed by the situation determinator 300, and automatic braking is possibly performed by the vehicle controller 400. In reality, however, the first pedestrian 51 does not move to the vehicle 10 side, but continues to move to the right side of the vehicle 10. As described above, if the recognition loss of the parallel moving object occurs, an unnecessary collision avoidance control is performed in a situation in which the collision avoidance control is originally not to be performed. The object recognition apparatus 200 according to the embodiment is configured to perform operations described later, to solve the technical problem due to the recognition loss as described above.

Explanation of Operations

Figure 4:
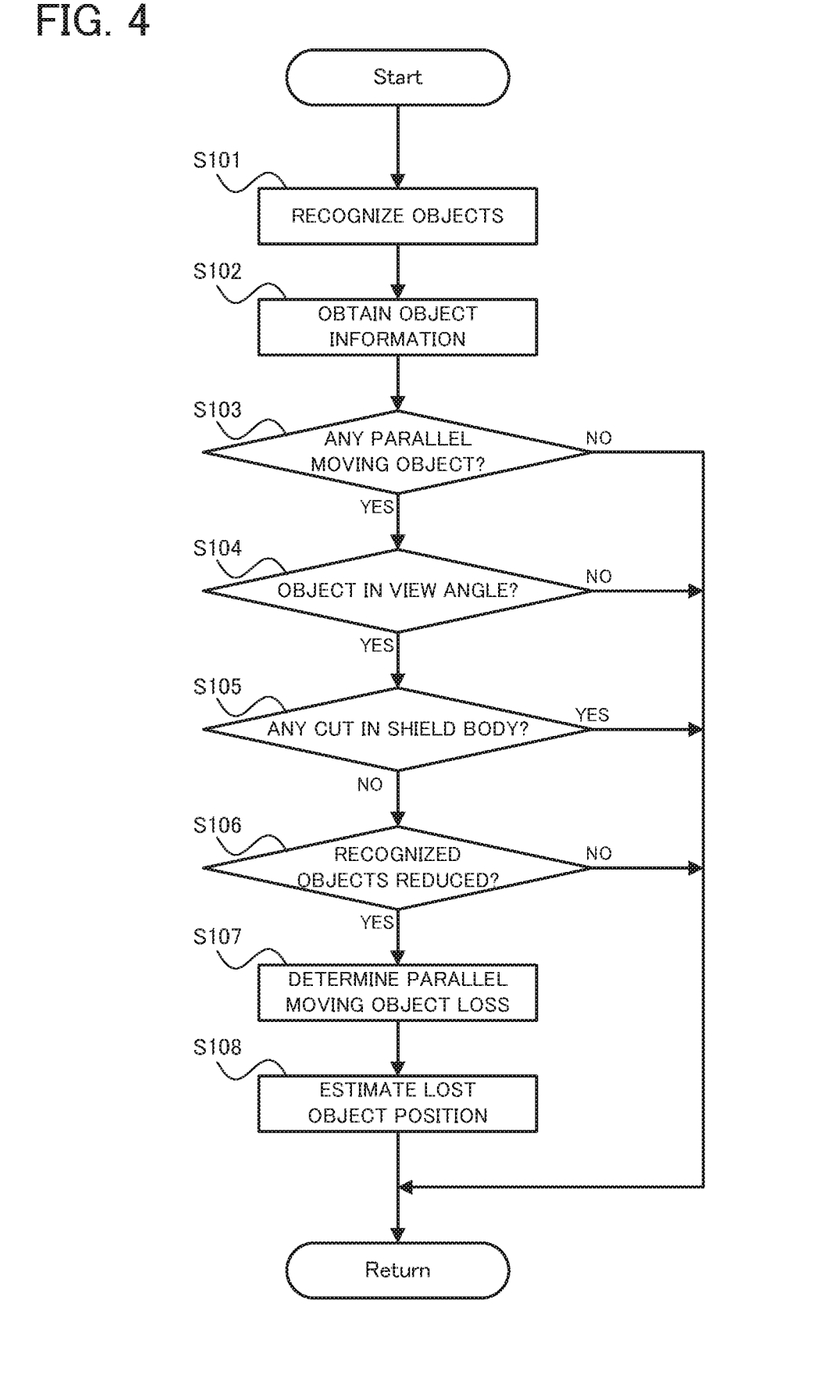
FIG. 4 is a flowchart illustrating a flow of operations of an object recognition apparatus according to the embodiment.

A flow of operations of the object recognition apparatus 200 according to the embodiment will be explained with reference to FIG. 4. FIG. 4 is a flowchart illustrating the flow of the operations of the object recognition apparatus according to the embodiment.

As illustrated in FIG. 4, in operation of the object recognition apparatus 200 according to the embodiment, firstly, the object recognizer 210 recognizes objects that are in an imaging range of the camera 110 (step S101). The object information acquirer 220 obtains various information about the objects recognized by the object recognizer 210 (step S102).

Figure 5:
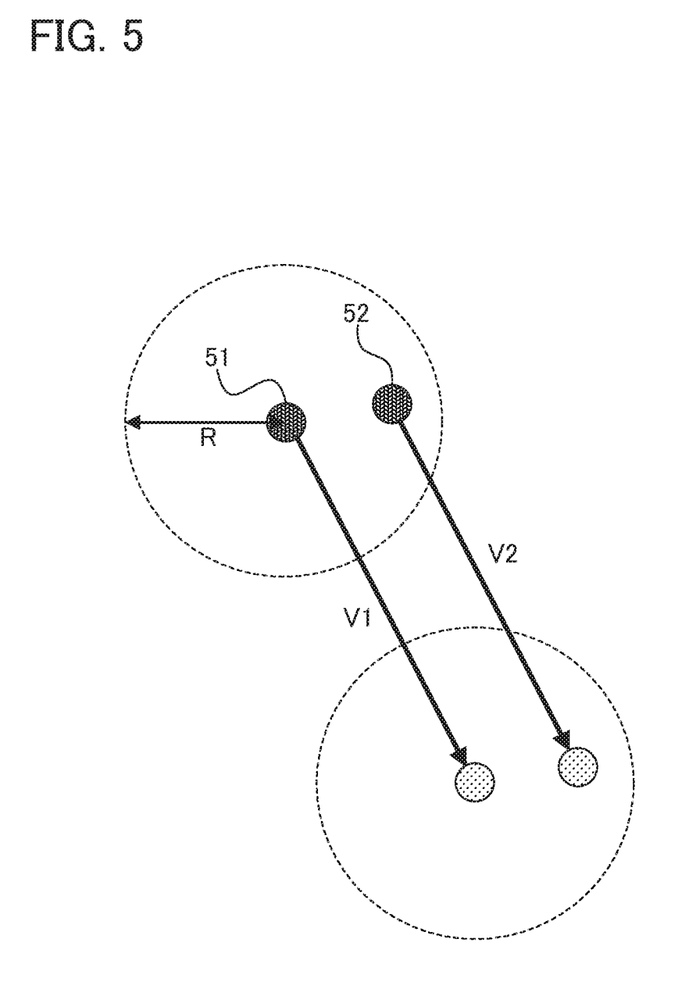
FIG. 5 is a conceptual diagram illustrating a method of determining the parallel moving objects.

The parallel moving determinator 230 determines whether or not there are the parallel moving objects among the objects recognized by the object recognizer 210 (step S103). Now, a specific method of determining the parallel moving objects will be explained in detail with reference to FIG. 5. FIG. 5 is a conceptual diagram illustrating the method of determining the parallel moving objects.

As illustrated in FIG. 5, the parallel moving determinator 230 may determine whether or not there are a plurality of objects in which a distance between the objects is less than or equal to R, on the basis of the information obtained by the object information acquirer 220. More specifically, the parallel moving determinator 230 may determine whether or not there are two or more objects in a circle with a radius R, illustrated in a dashed line in FIG. 5. The distance R may be a value set in advance by considering a distance when the objects move in parallel with each other. If the distance between the objects is less than or equal to R, it can be determined that the objects highly likely move in parallel with each other. In an example of FIG. 5, there are the first pedestrian 51 and the second pedestrian 52 in a circle with a radius R.

The parallel moving determinator 230 may then compare motion vectors of the plurality of objects in which the distance between the objects is less than or equal to R, and to determine whether or not a difference in the motion vectors is less than or equal to a predetermined threshold value Vr. In other words, the parallel moving determinator 230 may determine whether or not the objects make the same movement. In the example of FIG. 5, it may be determined whether or not a difference between a motion vector V1 of the first pedestrian 51 and a motion vector V2 of the second pedestrian 52 is less than or equal to Vr. The motion vectors V1 and V2 can be obtained by comparing past positions and present positions of the first pedestrian 51 and the second pedestrian 52.

If there are two or more objects in which the distance between the objects is less than or equal to R and in which the difference between the motion vectors is less than or equal to Vr, the parallel moving determinator 230 may determine that the objects are the parallel moving objects. The aforementioned determination method is merely an example, and another determination method may be used as long as it is possible to determine whether or not there are two or more objects that behave in a similar manner. For example, one of a plurality of information, such as the positions of the objects, a relative distance, directions and magnitudes of the motion vectors, an angle made by the motion vectors (i.e., a plurality of information about the behaviors of the objects (in other words, actions)) may be used, or a combination of at least two of the above information may be used for the determination.

Back in FIG. 4, if it is determined by the parallel moving determinator 230 that there are no parallel moving objects (the step S103: NO), the subsequent process is omitted, and a series of steps is ended. This is because the parallel moving object loss cannot occur if there are no parallel moving objects. In this case, the process is restarted from the step S101 after a lapse of a predetermined period. On the other hand, if it is determined that there are the parallel moving objects (the step S103: YES), the recognition determinator 240 determines whether or not at least one of the parallel moving objects is in the view angle of the camera 110, even in the second timing, which is later than the first timing in which the presence of the parallel moving objects is recognized (step S104).

If it is determined by the recognition determinator 240 that at least one of the parallel moving objects is not in the view angle of the camera 110 (the step S104: NO), the subsequent process is omitted, and a series of steps is ended. This is because the parallel moving object loss cannot occur (or it cannot be recognized) if the parallel moving object is out of the view angle. On the other hand, if it is determined that at least one of the parallel moving objects is in the view angle of the camera 110 (the step S104: YES), the recognition number determinator 250 determines whether or not there is the shield body, which is namely a thing that hinders the recognition of the objects, between the parallel moving objects and the camera 110 (step S105).

The presence/absence of the shield body can be determined by whether or not an object that could be the shield body is recognized by the object recognizer 210. Alternatively, the presence/absence of the shield body may be determined by whether or not a distance from the parallel moving objects to the camera 110 is less than a threshold value d. The threshold value d herein may be a threshold value for determining whether or not the parallel moving objects and the camera 110 (in other words, the vehicle 10) are so close that shield body cannot cut in between them. If the distance from the parallel moving objects to the camera 110 is less than the threshold value d, it can be determined that there is no room for the shield body to cut in, so that it is possible to determine the presence/absence of the shield body (i.e., that there is no shield body), without actually recognizing the shield body.

If it is determined by the recognition number determinator 250 that there is the shield body (the step S105: YES), the subsequent process is omitted, and a series of steps is ended. This is because the parallel moving object loss caused by the shield body occurs if there is the shield body, and thus, the parallel moving object loss cannot be accurately determined. On the other hand, if it is determined that there is no shield body (the step S105: NO), the recognition number determinator 250 further determines whether or not the number of the objects recognized in the second timing (in other words, the determination timing of the recognition determinator 240) is reduced in comparison with the number of the objects recognized in the first timing (i.e., the determination timing of the parallel moving determinator 230) (step S106). The determination may be performed to determine whether or not the parallel moving object loss of the recognized parallel moving objects occurs.

More specifically, the recognition number determinator 250 may compare the number of all the objects recognized in the first timing with the number of all the objects recognized in the second timing, and may determine whether or not the number of the recognized objects is reduced. In this case, the recognition loss of an object other than the parallel moving object may be included in the determination; however, this does not significantly adversely influence the determination result, because the recognition loss less likely suddenly occurs for the object other than the parallel moving object. If it is desired to surely eliminate the recognition loss of the object other than the parallel moving object, then, only the parallel moving objects may be focused, and it may be determined whether or not the number of the parallel moving objects recognized in the second timing is reduced from the number of the parallel moving objects recognized in the first timing. For example, if it is determined by the recognition determinator 240 that one of the parallel moving objects is recognized but the other is not recognized, then, it can be determined that the number of the parallel moving objects is reduced. If there are a plurality of object groups, each of which includes the parallel moving objects, i.e., if there are a plurality of parallel moving groups, the determination may be performed individually on each group.

If it is determined that the number of the objects recognized from the first timing to the second timing is not reduced (the step S106: NO), the subsequent process is omitted, and a series of steps is ended. This is because there is very little possibility that the parallel moving object loss occurs if the number of the objects is not reduced. On the other hand, if it is determined that the number of the objects recognized from the first timing to the second timing is reduced (the step S106: YES), the parallel moving loss determinator 260 determines that the parallel moving object loss occurs. In other words, if the number of the recognized objects is reduced even though there is at least one parallel moving object in the view angle in the second timing after it is determined that there are the parallel moving objects in the first timing, the parallel moving loss determinator 260 may determine that that the parallel moving object loss occurs. For example, if the first pedestrian 51 and the second pedestrian 52, who are the parallel moving objects, are recognized in the second timing, and if only the second pedestrian 52 is then recognized in the second timing but the first pedestrian 51 is not recognized, the parallel moving loss determinator 260 may determine that the first pedestrian 51 is in a parallel-moving-object-lost state, i.e., the first pedestrian 51 cannot be recognized due to an overlap with the second pedestrian 52.

Figure 6:
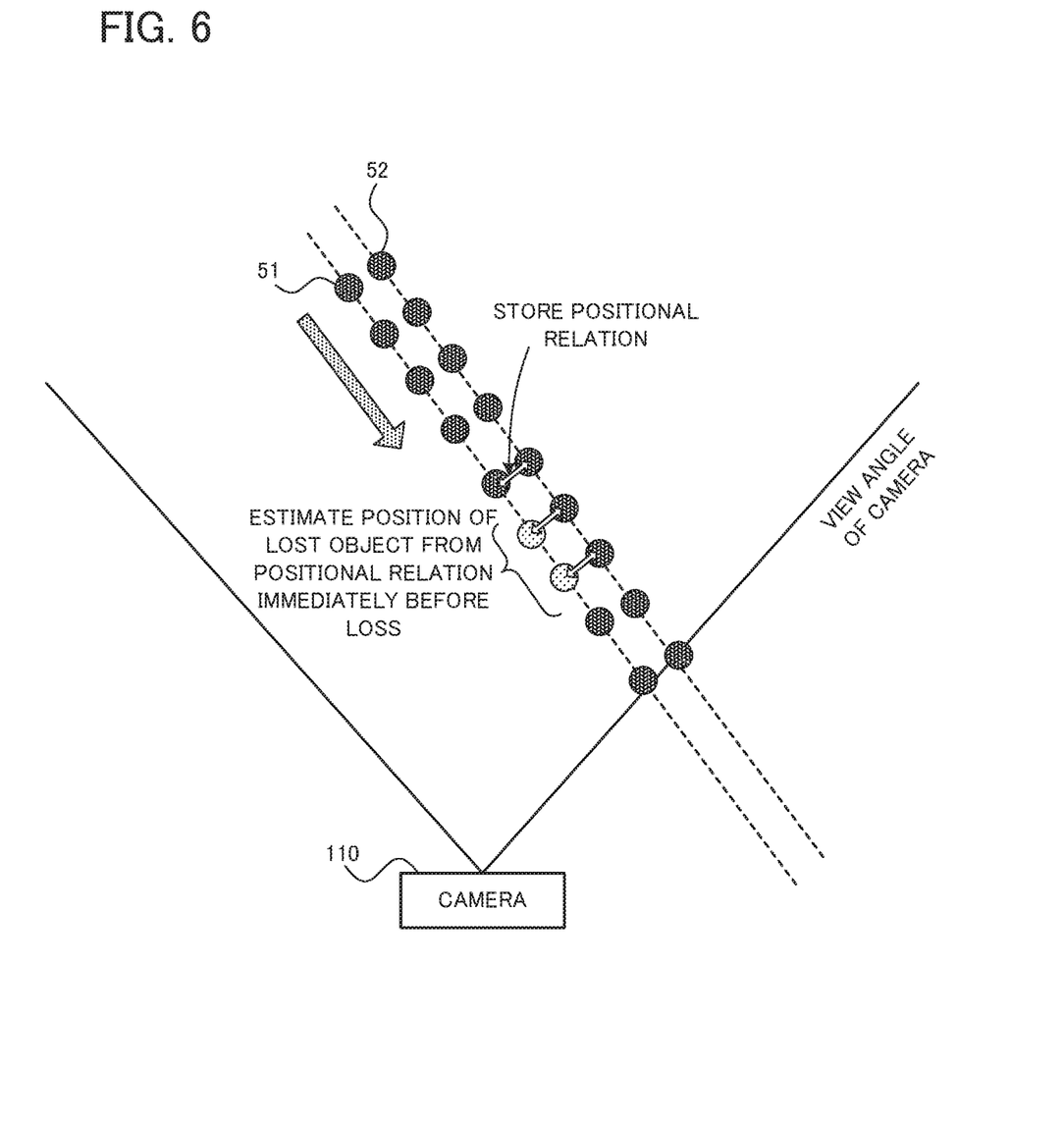
FIG. 6 is a map illustrating a position estimation method when the parallel moving object is lost.

If it is determined that the parallel moving object loss occurs, the object position estimator 270 estimates the position of the object that is parallel-moving-object-lost (step S108). Now, a method of estimating the position of the object that is parallel-moving-object-lost will be explained in detail with reference to FIG. 6. FIG. 6 is a map illustrating a position estimation method when the parallel moving object is lost.

As illustrated in FIG. 6, the object position estimator 270 stores therein a positional relation (or a relative relation) of the parallel moving objects. If the parallel moving object loss occurs, the object position estimator 270 may estimate the position of the object that is parallel-moving-object-lost, on the basis of the positional relation immediately before the loss. Specifically, the object position estimator 270 may estimate that the first pedestrian 51 that is parallel-moving-object-lost is also in a position deviated a little from the position of the second pedestrian 52, by using the fact that the positional relation between the first pedestrian 51 that is parallel-moving-object-lost and the second pedestrian 52 that is normally recognized, does not change between before and after the parallel moving object loss (i.e., they continue to move in parallel with each other).

Even if the parallel moving object loss occurs in a recognition result of the camera 110, the parallel moving object loss may not occur in recognition results of the radar 120 and the LIDER 130. Thus, if the parallel moving object loss occurs when only the camera 110 is used to recognize the object, the object may be recognized by using the radar 120 and the LIDER 130, in addition to or instead of the camera 110. In this case, the position of the object that is parallel-moving-object-lost can be estimated on the basis of the recognition results of the radar 120 and the LIDER 130.

Technical Effect

Next, an explanation will be given to a technical effect obtained by the object recognition apparatus 200 according to the embodiment.

As illustrated in FIG. 1 to FIG. 6, if the number of the recognized objects is reduced when there is no shield body even though at least one of the parallel moving objects is in the view angle after it is determined that there are the parallel moving objects, the object recognition apparatus 200 according to the embodiment may determine that the parallel moving object loss occurs. As described above, according to the object recognition apparatus 200 in the embodiment, it is possible to determine the occurrence of the parallel moving object loss in a relatively simple method. In other words, it is possible to determine the occurrence of the recognition loss and the cause of the recognition loss while suppressing a processing load of the apparatus.

As a general rule, the number of the objects recognized by the object recognition apparatus 200 is not reduced unless an arbitrary object deviates from the view angle of the camera 110, or unless the shield body cuts in between the camera 110 and the objects. Thus, if the number of the recognized objects is reduced even though at least one of the parallel moving objects continues to be in the view angle, it can be determined that the parallel moving object loss occurs; namely, it can be determined that the number of the objects that are actually in the view angle is not reduced, but it seems to be reduced due to the recognition loss of the parallel moving objects.

Supplementary Notes

Various aspects of embodiments of the present disclosure derived from the embodiment explained above will be explained hereinafter.

Supplementary Note 1

An object recognition apparatus described in Supplementary Note 1 is provided with: a recognizer configured to recognize a plurality of objects; an acquirer configured to obtain behavior information about behaviors of the objects recognized in first timing by the recognizer; a parallel moving determinator configured to determine whether or not a parallel moving condition is satisfied on the basis of the behavior information, wherein the parallel moving condition indicates that there are a first object and a second object, which move in parallel with each other, among the objects recognized in the first timing; a recognition determinator configured to determine whether or not a recognition condition is satisfied, wherein the recognition condition indicates that there is the second object among the objects recognized by the recognizer in second timing, which is later than the first timing; a recognition number determinator configured to determine whether or not a recognition number condition is satisfied, wherein the recognition number condition indicates that a number of the objects recognized in the second timing is reduced in comparison with a number of the objects recognized in the first timing; and a parallel moving loss determinator configured to determine that the first object is in a parallel-moving-object-lost state in which recognition by the recognizer cannot be performed due to an overlap with the second object, if the recognition condition and the recognition number conditions are satisfied in the second timing, after the parallel moving condition is satisfied in the first timing.

According to the object recognition apparatus described in Supplementary Note 1, if the first object and the second object, which move in parallel with each other, are recognized in the first timing and the second object is then recognized in the second timing, and if the number of the objects recognized in the second timing is reduced from the number of the objects recognized in the first timing, it is then determined that the first object is in the parallel-moving-object-lost state. In other words, if the number of the recognized objects is reduced even though one of the parallel moving objects continues to be recognized, it is then determined that the recognition loss occurs due to the parallel movement. This is because it is unlikely that only the first object vanishes out of the parallel moving objects, and it can be determined that the first object highly likely cannot be recognized, temporarily, due to the overlap with the second object.

By virtue of the aforementioned configuration, it is possible to determine the recognition loss of the parallel moving objects. More specifically, it is possible to accurately determine the occurrence of the recognition loss and the cause of the recognition loss. It is thus possible, for example, to avoid erroneous recognition of the objects due to the recognition loss, or to accurately estimate the position of the object that is recognition-lost. As a result, it is possible to perform a control based on the recognition result of the object (e.g., the collision avoidance control, etc.).

Supplementary Note 2

In an object recognition apparatus described in Supplementary Note 2, the recognition determinator is configured to determine that the recognition condition is satisfied, if the first object is not recognized in the second timing but the second object is recognized in the second timing.

According to the object recognition apparatus described in Supplementary Note 2, it can be determined that the number of the recognized objects is reduced because the first object cannot be recognized. In other words, it can be confirmed that the reduction in the number of the recognized objects is not influenced by a recognition result of another object other than the first object and the second object. It is thus possible to more accurately determine the parallel moving object loss of the first object.

Supplementary Note 3

In an object recognition apparatus described in Supplementary Note 3, it is further provided with a lost object position acquirer configured to obtain positional information of the first object in the second timing, on the basis of positional information of the second object in the second timing, if it is determined that the first object is in the parallel-moving-object-lost state.

According to the object recognition apparatus described in Supplementary Note 3, it is possible to accurately estimate a first object position after the recognition loss, by using the fact that the first object that is parallel-moving-object-lost continues to move in parallel with the second object.

Supplementary Note 4

In an object recognition apparatus described in Supplementary Note 4, it is provided with: a recognizer configured to recognize a plurality of objects; an acquirer configured to obtain behavior information about behaviors of the objects recognized in first timing by the recognizer; a parallel moving determinator configured to determine whether or not a parallel moving condition is satisfied on the basis of the behavior information, wherein the parallel moving condition indicates that there are a plurality of parallel moving objects, which move in parallel with each other, among the objects recognized in the first timing; a recognition determinator configured to determine whether or not a recognition condition is satisfied, wherein the recognition condition indicates that there is at least one of the plurality of parallel moving objects among the objects recognized by the recognizer in second timing, which is later than the first timing; a recognition number determinator configured to determine whether or not a recognition number condition is satisfied, wherein the recognition number condition indicates that a number of the parallel moving objects recognized in the second timing is reduced in comparison with a number of the parallel moving objects recognized in the first timing; and a parallel moving loss determinator configured to determine that a first object out of the plurality of parallel moving objects is in a parallel-moving-object-lost state in which recognition by the recognizer cannot be performed due to an overlap with a second object out of the plurality of parallel moving objects, if the recognition condition and the recognition number conditions are satisfied in the second timing, after the parallel moving condition is satisfied in the first timing.

According to the object recognition apparatus described in Supplementary Note 4, if the plurality of parallel moving objects, which move in parallel with each other, are recognized in the first timing and at least one of the parallel moving objects is then recognized in the second timing, and if the number of the parallel moving objects recognized in the second timing is reduced from the number of the parallel moving objects recognized in the first timing, it is then determined that the first object is in the parallel-moving-object-lost state due to the overlap with the second object. In other words, if the number of the recognized parallel moving objects is reduced even though at least one of the parallel moving objects continues to be recognized, it is then determined that the recognition loss occurs due to the parallel movement. By virtue of such a configuration, it is possible to determine the recognition loss of the parallel moving objects. More specifically, it is possible to accurately determine the occurrence of the recognition loss and the cause of the recognition loss.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. An object recognition apparatus configured to be mounted in a vehicle, the object recognition apparatus comprising:
   an electronic control unit (ECU) configured to:
      recognize a plurality of objects;
      obtain behavior information about behaviors of objects recognized in a first timing among the plurality of objects;
      determine whether a parallel moving condition is satisfied on the basis of the behavior information, wherein the parallel moving condition indicates that there is a first object and a second object, which move in parallel with each other, among the objects recognized in the first timing;
      determine whether a recognition condition is satisfied, wherein the recognition condition indicates that the second object is among objects recognized in a second timing, which is later than the first timing;
      determine whether a recognition number condition is satisfied, wherein the recognition number condition indicates that a number of the objects recognized in the second timing is reduced in comparison with a number of the objects recognized in the first timing; and
      determine that the first object is in a parallel-moving-object-lost state in which recognition cannot be performed due to an overlap with the second object, if the recognition condition and the recognition number conditions are satisfied in the second timing, after the parallel moving condition is satisfied in the first timing.

2. The object recognition apparatus according to claim 1, wherein said ECU is further configured to determine that the recognition condition is satisfied, if the first object is not recognized in the second timing but the second object is recognized in the second timing.

3. The object recognition apparatus according to claim 1, wherein the ECU is further configured to obtain positional information of the first object in the second timing, on the basis of positional information of the second object in the second timing, if it is determined that the first object is in the parallel-moving-object-lost state.

* * * * *